Sept. 29, 1964

E. L. LEE

CAPACITOR STORAGE DEVICE FOR SHIFT REGISTER APPLICATIONS 3,151,251

Filed Dec. 21, 1959

2 Sheets-Sheet 1

INVENTOR.

ELWOOD L. LEE

BY

Thomas & Crickenberger

ATTORNEYS

Sept. 29, 1964
E. L. LEE
3,151,251
CAPACITOR STORAGE DEVICE FOR SHIFT REGISTER APPLICATIONS
Filed Dec. 21, 1959
2 Sheets-Sheet 2

INVENTOR.
ELWOOD L. LEE
BY
Thomas & Crickenberger
ATTORNEYS 3,151,251

CAPACITOR STORAGE DEVICE FOR SHIFT REGISTER APPLICATIONS

Elwood L. Lee, Newark Valley, N.Y., assignor to International Business Machines Corporation, New York, N.Y., a corporation of New York

Filed Dec. 21, 1959, Ser. No. 861,025
5 Claims. (Cl. 307—88.5)

This invention relates to a capacitor delay circuit, and more particularly to a capacitor delay circuit for shift register applications in which a Zener diode element is utilized to control the charge and discharge cycles of the capacitor.

In various computer applications, such as shift register systems, it is necessary to employ some means to delay or to store temporarily the information signals being utilized. A number of different circuits have been employed in the past with satisfactory results; however, none of these has proved to be adaptable to all conditions, and the individual capabilities of each circuit must be examined carefully to determine its usefulness. In deciding upon the desirability for use in computers, individual factors to be given consideration are reliability, frequency or speed of operation, the number of circuit components required and the current consumption of the circuits. The present invention provides a circuit which meets favorably all of these factors.

In one arrangement of the invention, a transistor circuit is provided in which a capacitor is caused to be charged by an information input signal and holds this charge for a predetermined length of time, thereby causing the input information signal to be delayed. The information signal is used to turn on a transistor switch which allows the capacitor to be charged through a Zener diode element. After the transistor has stopped conducting, the next clock pulse applied to the capacitor initiates a discharge cycle which produces an output pulse. The amount of delay introduced is the interval between the information pulse and the next subsequent clock pulse. By cascading a number of these stages together, any desired amount of delay may be obtained.

This arrangement according to the invention is illustrated in the accompanying drawings in which.

Figure 1:
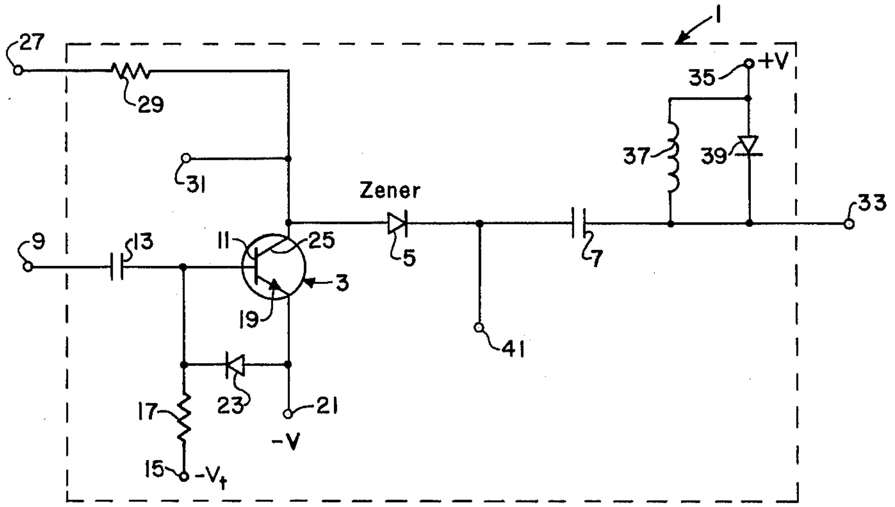
FIG. 1 is a schematic diagram of the circuit.

Referring now to FIG. 1 of the drawings, the numeral 1 is used to indicate generally the complete circuit of the invention. The basic elements of this circuit are a transistor 3, a Zener diode 5 and a capacitor 7. Input terminal 9 receives the information pulses, and is connected to the base element 11 of transistor 3 through D.C. isolating condenser 13. The base element 11 is also connected to a source of negative potential $-V_t$ at terminal 15 through a resistor 17. The emitter element 19 of transistor 3 is connected to a source of negative potential $-V$ at terminal 21. Emitter element 19 and base element 11 are unidirectionally connected by a diode 23. The collector 25 of transistor 3 is connected to the clock pulse input terminal 27 through a resistor 29. Terminal 31, which will be referred to subsequently in the description of the circuit operation, is connected directly to collector element 25.

Figure 3:
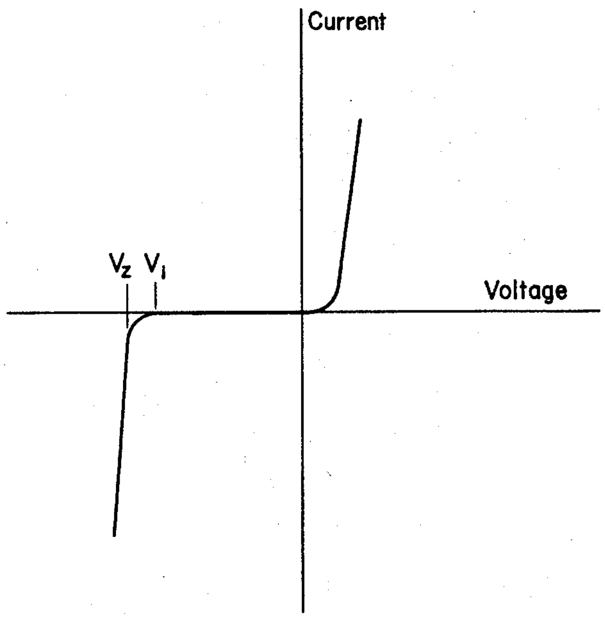
FIG. 3 is a graphical representation of the current-voltage characteristic of a Zener diode element.

The Zener diode 5 has one side connected to collector element 25 and the other side connected to output terminal 33 through capacitor 7. The output terminal 33 is connected to a source of positive potential $+V$ at terminal 35 through the parallel combination of inductor 37 and diode 39. Terminal 41 which is located between Zener diode 5 and capacitor 7 will be referred to later in the description of operation. Diode 5 is chosen to have a Zener voltage $V_z$ equal to V. $V_z$ is the voltage value at which the high reverse impedance of the diode breaks down and allows the passage of a large current with no further increase in voltage. This may be seen from FIG. 3, which is a voltage-current diagram of the operation characteristics of the diode. The cut-off voltage of the Zener diode 5 is shown in FIG. 3 as $V_1$, a value slightly less than the Zener voltage.

Figure 2:
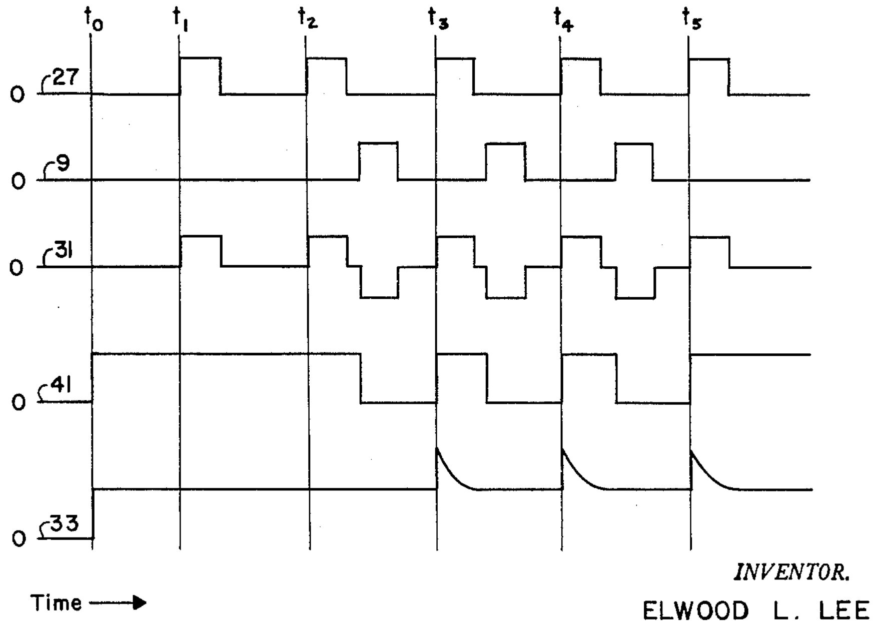
FIG. 2 is a pulse timing diagram to illustrate the theory of operation.

The operation of the circuit will now be described in connection with FIGS. 1 and 2 of the drawings. FIG. 2 is a pulse timing diagram, and the numerals 27, 9, 31, 41 and 33 indicate the potentials at the various terminals of FIG. 1 which bear corresponding numbers. The zeros at the left hand margin of FIG. 2 indicate zero potential reference lines.

For purposes of the description, it will be assumed that the values of bias potentials $+V$ and $-V$ are numerically equal, and that the clock pulses at terminal 27 and the information pulses at terminal 9 swing from zero or ground potential to value equal to $+V$. The sign of $V_t$ is the same as $-V$, but the numerical value is greater. It will also be assumed that all of the bias potentials of FIG. 1 are applied to time $t_0$. At $t_0$ the potential at output terminal 33 rises immediately to a value of $+V$, and does not drop below this value as long as the circuit is in operation. The waveform at terminal 41 is helpful in understanding the action of capacitor 7 and Zener diode 5. At time $t_0$ capacitor 7 begins to charge rapidly through diode 39, Zener diode 5 and resistor 29 to ground, which is the potential of terminal 27 when no clock pulse is present. This charging cycle of capacitor 7 is possible because the voltage across Zener diode 5 is initially equal to its Zener voltage, thereby breaking down the diode to a low resistance reverse path. When capacitor 7 has charged sufficiently to reduce the voltage across Zener diode 5 to a value of $V_1$, as shown in FIG. 3, the diode cuts off and once again presents a very high reverse impedance. At this point the capacitor will have a charge equal to $V-V_1$, a very low voltage. Since this charging cycle is virtually instantaneous, at time $t_0$ the potential at terminal 41 will therefore rise from zero and become stable at $V_1$.

At time $t_1$ when the first clock pulse occurs, the potential at terminal 27 will rise to a value of $+V$, but since there is substantially no charge on condenser 7 and the output terminal is already biased at a value of $+V$, there will be no output pulse at terminal 33. Likewise, any subsequent clock pulses, such as the one occurring at $t_2$, will fail to produce an output pulse.

Shortly after time $t_2$, an information pulse occurs at terminal 9. This pulse turns on transistor 3, thereby completing a conductive path from collector 25 to emitter 19. The results of this action are indicated by the potential at terminal 31, which drops to a value of $-V$, since terminals 21 and 31 are now directly connected. With this conductive path established, the Zener diode 5 has a potential difference impressed across it of nearly the numerical value 2V. Since the Zener voltage, $V_z$, has been exceeded, diode 5 breaks down and conducts in the reverse direction, thereby rapidly charging condenser 7 to the full value of $+V$ through diode 39, Zener diode 5, transistor 3 and terminal 21. When the voltage across the Zener diode 5 drops to a value equal to V1, the cutoff voltage of the diode, the reverse conduction will stop, and the charge on capacitor 7 will be approximately equal to $+V$. When capacitor 7 is thus fully charged, the potential at terminal 41 will be zero. Upon the termination of the information pulse, the transistor 3 will turn off, thereby interrupting the conductive path through collector element 25 and emitter element 19 and returning terminal 31 to ground potential.

The next clock pulse, which occurs at time $t_3$, causes terminal 27 to rise to a potential equal to +V. Since terminal 41 is at ground potential, the Zener diode 5 will conduct in the forward direction and cause terminal 41 to rise to a potential approximately equal to +V. Capacitor 7 having already been charged to the full value of +V, the clock pulse occurring at time $t_3$ will initiate a discharge cycle for capacitor 7 which produces an output pulse at terminal 33 as indicated by the waveform of FIG. 2. Immediately after the clock pulse at time $t_3$ ceases, the potential at terminal 31 will return to zero. Since the potential difference across capacitor 7 is then equal to zero, the initial charging action described as occurring at $t_0$ is repeated until capacitor 7 is charged to a value of $V-V_1$, a very low voltage. In this condition, subsequent clock pulses will fail to produce an output pulse at terminal 33 until an information pulse at terminal 9 has turned on transistor 3 to charge capacitor 7 to the full value of +V as previously described. The amount of delay which will be introduced between each information pulse at terminal 9 and the corresponding output pulse at terminal 33 will be the interval between the information pulse at terminal 9 and the next subsequent clock pulse at terminal 27.

Figure 4:
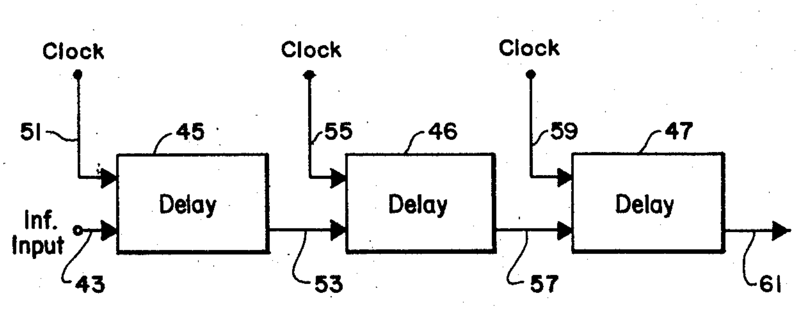
FIG. 4 is a block diagram showing the way in which a number of circuits according to the invention may be serially connected to effect any desired delay.

It will be appreciated that a number of the circuits 1 of FIG. 1 may be cascaded, as shown in FIG. 4, to give any desired amount of delay. An obvious application for such an arrangement would be a shift register system in which the information to be shifted is applied to terminal 43 of delay circuit 45. The clock line 51 supplies clock pulses to delay circuit 45 which operates in identical fashion to the circuit 1 of FIG. 1 described previously. The clock pulse on line 51 produces a delayed information output pulse on line 53. In like manner, the information pulse on line 53 initiates the action of delay circuit 46 such that the subsequent presence of a clock pulse on line 55 produces an output pulse on line 57 which is delayed with respect to the initiating pulse on line 53. Similarly, the information pulse on line 57 and the clock pulse on line 59 cause a delayed output pulse to appear on line 61. This cascading of stages may be continued indefinitely to give any number of shift positions required. The timing diagram (FIG. 2) shows each clock pulse 27 as immediately preceding each information pulse 9. This yields the greatest delay per delay circuit, but the clock pulses 27 and the information pulses 9 can be in any particular timing relationship, consistent with the desired delay, as long as they do not occur at the same time. For example, the clock lines 51 and 59 could have identical timing, but clock line 55 has to provide a pulse that occurs after 51 or 59 but during the same period.

While the invention has been illustrated and described in one arrangement, it is recognized that variations and changes may be made therein without departing from the invention as set forth in the claims.

What is claimed is:

1. A delay circuit comprising a source of clock pulses, a source of information pulses, an output terminal, a Zener diode and a capacitor serially connected between said source of clock pulses and said output terminal, a source of positive potential connected to said output terminal, and a source of negative potential connected to said Zener diode through switch means, said source of information pulses being connected to and serving to control said switch means whereby an information pulse will be delayed from reaching said output terminal until the next subsequent clock pulse occurs.

2. The combination according to claim 1 wherein a plurality of such circuits are cascaded with the output terminal of each circuit serving as the source of information pulses for each succeeding circuit.

3. A delay circuit for use with sources of information and clock pulses comprising a transistor having a base element, an emitter element and a collector element, an information input terminal connected to said base element, a source of negative potential connected to said emitter element, a clock input terminal, an information output terminal, a Zener diode and a capacitor serially connected between said clock input terminal and said output terminal, means connecting said collector element to said Zener diode, and means for applying a source of positive potential to said output terminal, whereby any information pulses applied to said information input terminal will be delayed from reaching said output terminal until the next subsequent clock pulse is applied to said clock input terminal.

4. The combination according to claim 3 wherein said means for applying a source of positive potential to said output terminal comprises the parallel combination of an inductance and a diode.

5. The combination according to claim 3 wherein a plurality of such circuits are cascaded with the output terminal of each circuit being connected to the information input terminal of the next succeeding circuit.

References Cited in the file of this patent

UNITED STATES PATENTS

| | | |
|---|---|---|
| 2,722,601 | Piel | Nov. 1, 1955 |
| 2,924,724 | Booker | Feb. 9, 1960 |
| 2,951,230 | Cadden | Aug. 30, 1960 |

FOREIGN PATENTS

| | | |
|---|---|---|
| 552,895 | Italy | Dec. 12, 1956 |